United States Patent [19]

Rotolo

[11] 4,361,758
[45] Nov. 30, 1982

[54] SUN POSITION SENSOR FOR TWO AXIS TRACKING

[75] Inventor: Guglielmo E. Rotolo, Des Plains, Ill.

[73] Assignee: Dow Corning Corporation, Midland, Mich.

[21] Appl. No.: 183,123

[22] Filed: Sep. 2, 1980

[51] Int. Cl.³ .............................................. G01J 1/20
[52] U.S. Cl. .................... 250/203 R; 126/425
[58] Field of Search ............. 250/203 R, 211 R, 578; 356/141, 152, 222, 215, 220; 126/424, 425

[56] References Cited

U.S. PATENT DOCUMENTS

| | | | |
|---|---|---|---|
| 4,153,038 | 5/1979 | McDonald | 126/425 |
| 4,287,411 | 9/1981 | Beucci | 250/203 R |
| 4,297,572 | 10/1981 | Carlton | 250/203 R |

*Primary Examiner*—David C. Nelms
*Attorney, Agent, or Firm*—Howard W. Hermann

[57] ABSTRACT

A sun position sensor including a plurality of solar sensors sensing solar energy arriving in a respective azimuth and elevational direction, data encoding means for a series of respective solar azimuth and elevational positions, each position corresponding to a respective solar sensor and wherein said data encoding means are coupled to the solar sensors to derive a sensed solar position, a solar collector effective for receiving solar energy in a discrete direction, drive means positioning the solar collector and providing position data corresponding to the position of the solar collector, and comparator means comparing the collector position and the solar position and providing a drive signal until the two positions are equal. A geodesic dome portion includes several facets each of which contains a respective plurality of solar sensors to provide an electrical output signal representing the amount of solar incidence on a respective sensor/dome facet.

12 Claims, 3 Drawing Figures

SUN POSITION SENSOR FOR TWO AXIS TRACKING

This invention relates to apparatus for positioning and tracking the sun, such as in solar energy converter systems, and particularly to a sun position sensor for two axis tracking of the sun.

BACKGROUND OF THE INVENTION

In many solar energy conversion systems, it is required that a concentrated solar collector is continuously repositioned to track and follow the sun in order to obtain efficient solar energy collection. In general, the collector is driven in either direction until the solar energy received from two tracking sensors reaches equilibrium, thus indicating that the collector is directly facing the solar rays. Such prior art tracking systems with a concentrated solar collector require at least some solar energy to be incident on the tracking sensors.

However, where solar concentrators are used for instance to increase the solar efficiency, the solar capture angle of the collector is relatively narrow. Thus, if the sun is obscured by clouds for any period of time, and the rays are no longer within the collector capture angle, the high resolution tracking sensors do not receive any or at least sufficient solar energy to drive the collector towards the desired equilibrium position where the sun will be directly incident on the collector. Several prior art solutions to this problem involve providing a separate memory unit which stores the tracking data and from which the subsequent tracking requirement can be interpolated to continue to drive the collector in the same direction. Thus, in such systems, it is hoped that the sun's rays will be within the collector capture angle when the sun reappears.

This loss of sun, however, can occur under one or more daily cloudy conditions each lasting anywhere from a few minutes to the entire day when the sunlight is obscured. In these conditions the prior art system continues to use energy to drive the collector in an attempt to locate the sun—even if there is no sun for the rest of the day. Thus, in some cases, the net system energy would be negative; i.e. the system will be using more energy to try to find the sun than the energy converted during the periods of time when the sun is out.

Accordingly, it is desired to provide a solar tracking system for solar collectors which will significantly reduce the use of energy during time periods when the sun is obscured. Secondly, it is desired to provide a system without the need for relatively expensive storage devices for storing tracking data. Also, it is desired to provide such a tracking system where the collector will automatically positioned to directly face the sun, when, after a period of solar obstruction, the sun appears unobstructed—without the need to interpolate tracking data or to track continuously during the period of sun obstruction.

SUMMARY OF THE INVENTION

In accordance with the principles of the present invention there is provided a solar position sensor for a solar tracking collector, which includes a plurality of solar sensors such as photo cells which are mounted in respective facets of a geodesic dome. The series of solar sensors are so mounted on the dome facets in order that they will sequentially face the sun at substantially normal angles of solar incidence during the sun's apparent movement from east to west. Electrically, the series of solar sensors are connected in a matrix array with the matrix position of each sensor corresponding to the azimuth and elevation position of solar incidence on the dome. One axis of the matrix array corresponds to the solar azimuth and the other matrix axis corresponds to the solar elevation.

Coded means are provided coupled to the matrix array of solar sensors to code the respective matrix columns and rows. The coded information which corresponds to the sensed solar azimuth and elevation is coupled to a respective comparator. The apparatus also includes a solar tracking collector/concentrator having a predetermined solar capture angle and means for driving the collector in the azimuth and elevational axes. Coded means are provided on the collector to provide data corresponding to the position of the collector in azimuth and elevation. This data is fed to the respective comparator and compared with the coded information from the matrix array. The respective comparator compares the collector data position information with the matrix coded sensor information and provides drive signals to move the collector to an azimuth and elevation position which corresponds to the sensed solar position.

In a preferred embodiment to the invention, the solar sensors are mounted on a respective dome facet such that the sun is normal to a facet for a period of about one hour. Eleven groups of solar sensors or photo cells are thus arranged on the geodesic dome in order to cover substantially the full period of daytime hours. Electrically, the sensors are mounted in a five columns by three rows matrix array with the corresponding codes for each column and row being fed to the respective azimuth and elevation comparator. The solar two axis tracking collector is provided with respective follower potentiometers mounted on the azimuth collector drive shafts. Analog information corresponding to the respective azimuth and elevational position of the tracking collector is converted into digital data form and fed to the comparator for comparison with the column and row codes of the solar sensor matrix. The respective comparators therefore compare the sensed solar azimuth and elevation with the instantaneous collector position in azimuth and elevation. Respective azimuth and elevation signals are derived from the respective comparators to move the tracking collector to an equilibrium position where the coded matrix information is the same as the tracking collector position data. When that point is reached, the tracking collector is facing the sun at an azimuth and elevation which corresponds to the activated solar sensor on the geodesic dome.

Once the tracking collector has been positioned by the solar geodesic dome sensor/matrix array as described above, respective pairs of high resolution azimuth and elevation tracking sensors mounted on the solar collector/concentrator maintain the collector/concentrator in a tracking position of maximum solar collection. If the sun remains unobscured, the respective pairs of tracking sensors continue to move the collector in respective azimuth and elevational directions to follow the sun in its apparent east to west movement. If the sun becomes obscured, the collector is maintained in its last position. When the sun again reappears, one of the solar position sensors on the geodesic dome will be activated and the corresponding azimuth and elevational code information from the matrix array will be fed to the respective comparator. The solar collector will then be driven until the azimuth and elevational follower potentiometer provides position data which equals the matrix array code in both azimuth and elevation, and the respective pairs of tracking sensors will again resume the high resolution collector positioning and tracking of the sun. Thus, the collector is not continuously moved if the sun is obscured, and little if any energy is wasted during this time when no solar energy conversion is occurring. In addition, the solar collector/concentrator is immediately repositioned as soon as the sun reappears without the need for any expensive data storage/memory devices or data interpolation logic elements.

DETAILED DESCRIPTION

Figure 1:
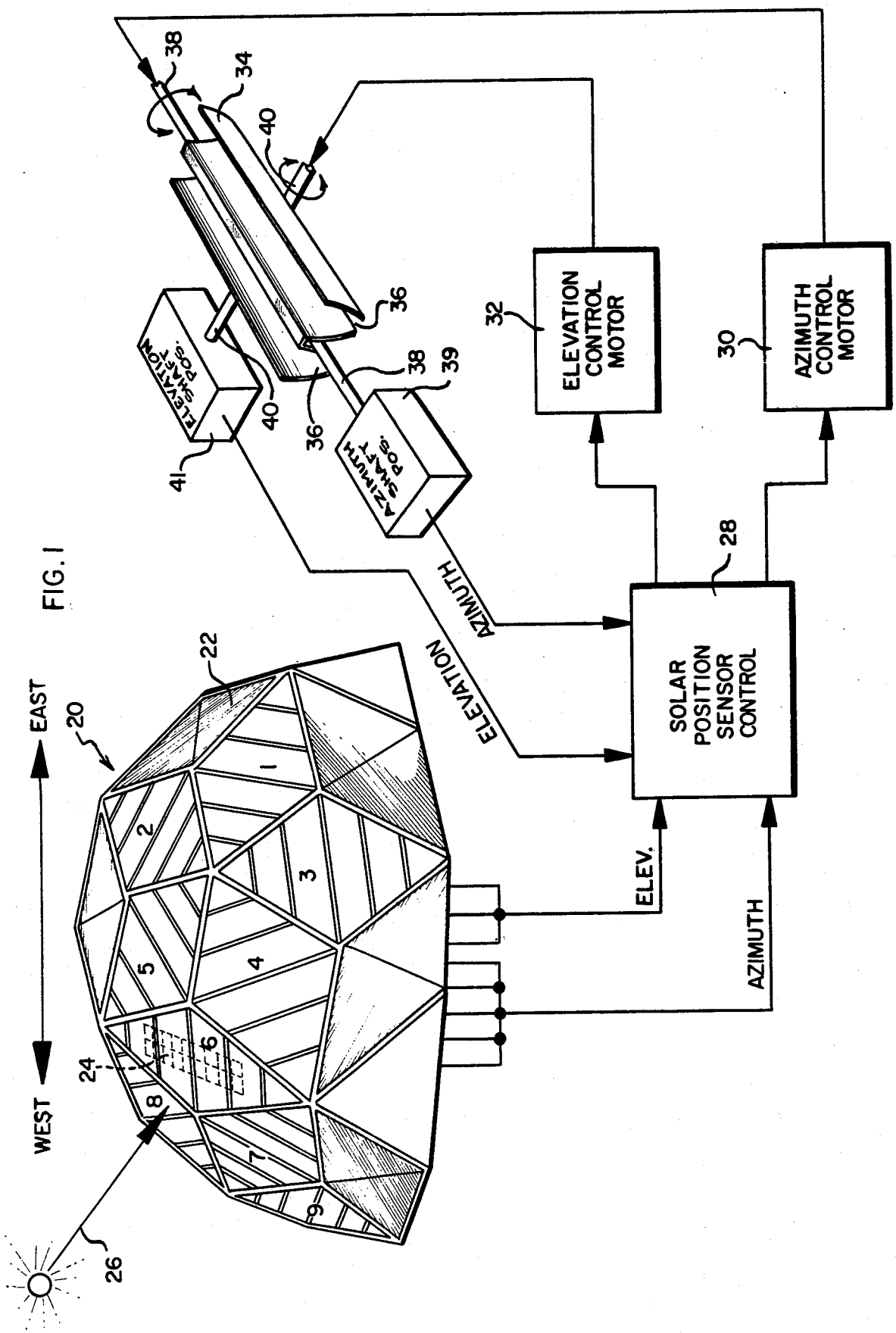
FIG. 1 is a schematic illustration of the apparatus of the present invention, including the series of solar sensors on a geodesic dome for positioning a two axis solar collector/concentrator in the azimuth and elevational directions.

FIG. 1 illustrates a solar position sensor in accordance with the present invention for a two axis solar collector/concentrator. The apparatus includes a geodesic dome 20 of hemi-spherical form and which includes a plurality of polygonal facets 22 consisting of flat planes. Geodesic domes are well known self supporting structures in which the facets distribute stresses within the structure itself. Within selected facets identified in FIG. 1 with reference numerals 1-9, there is suitably mounted a plurality of solar sensors such as photo cells 24 as noted for example in geodesic dome facet 6 mounted by the cross struts. For convenience, only facet 6 has been illustrated with the plurality of solar sensors 24, it being understood that a similar plurality of solar sensors 24 are also mounted in the other facets 1-5 and 7-9 shown in FIG. 1 as well as an additional facets 10 and 11 which are beyond illustration in the view of FIG. 1.

Geodesic dome 20 is mounted on a flat surface and arranged such that facet 6 faces upwardly at an angle equal to the geographical latitude angle at the dome position. Thus, in the solar position shown in FIG. 1, the incident solar rays 26 are in the noontime position at an angle of normal incidence on facet 6 and the corresponding solar sensors 24. Thus, for the eleven facets in the dome and description herein, during the sun's apparent movement from east to west, five discernible azimuth positions and three discernible elevation positions can be sensed. That is, the solar azimuth position can be discerned in connection with the respective grouped facets 1, 2, 3; 4, 5; 6; 7, 8; and 9, 10, 11. Similarly, three different solar elevation positions can be discerned, namely respective grouped facets 3, 5, 6, 7, 10; 1, 6, 11; and 2, 4, 6, 8, 9. The geodesic dome may be of any suitable size sufficient to enable the sun to be sequentially directed at a substantially normal incident angle to respective dome facets as the sun traverses its apparent east to west movement during the day.

The respective azimuth and elevation position sensed by the solar sensors is coupled to a solar position sensor control 28 for developing suitable signals to activate respective azimuth control motor 30 and elevation control motor 32 to drive a solar collector/concentrator 34 in both the azimuth and elevational directions. Solar concentrator 34 includes a standard array of solar collectors 36 and means for concentrating the incident solar energy to the collectors 36. Solar concentrator 34 is a well known, commercially available device which includes an azimuth shaft 38 and an elevational shaft 40, the respective shafts being coupled in a well known manner to the respective azimuth and elevation control motors. A pair of high resolution tracking solar sensors are mounted on the concentrator 34 for positioning the solar concentrator in the azimuth direction. A similar pair of tracking sensors are also provided for enabling the concentrator 34 to be moved in the elevation direction. Such tracking elements are well known in the art to provide suitable signals to the respective motors so that the concentrator 34 can track an unobstructed sun.

However, such prior art concentrators have a narrow range of solar capture angle, i.e., the band of incident angles of solar radiation which is effective to activate the tracking sensors. If during a period of sun obstruction, the sun has moved beyond the collector's capture angle range, the tracking sensors are not activated when the sun reappears. Thus, the concentrator is stationary and must be repositioned by other means in order to again face the sun.

In accordance with the principles of the present invention, the azimuth shaft 38 includes an azimuth shaft position sensor 39 and an elevation shaft position sensor 41 coupled to the respective solar concentrator shafts 38, 40 for determining the concentrator azimuth and elevation shaft positions and coupling this information on respective lines to the solar position sensor control 28. As will be explained hereinafter, control 28 compares the sensed solar position with the collector/concentrator position and drives the collector control motors 30, 32 until the positions are equal.

Figure 2:
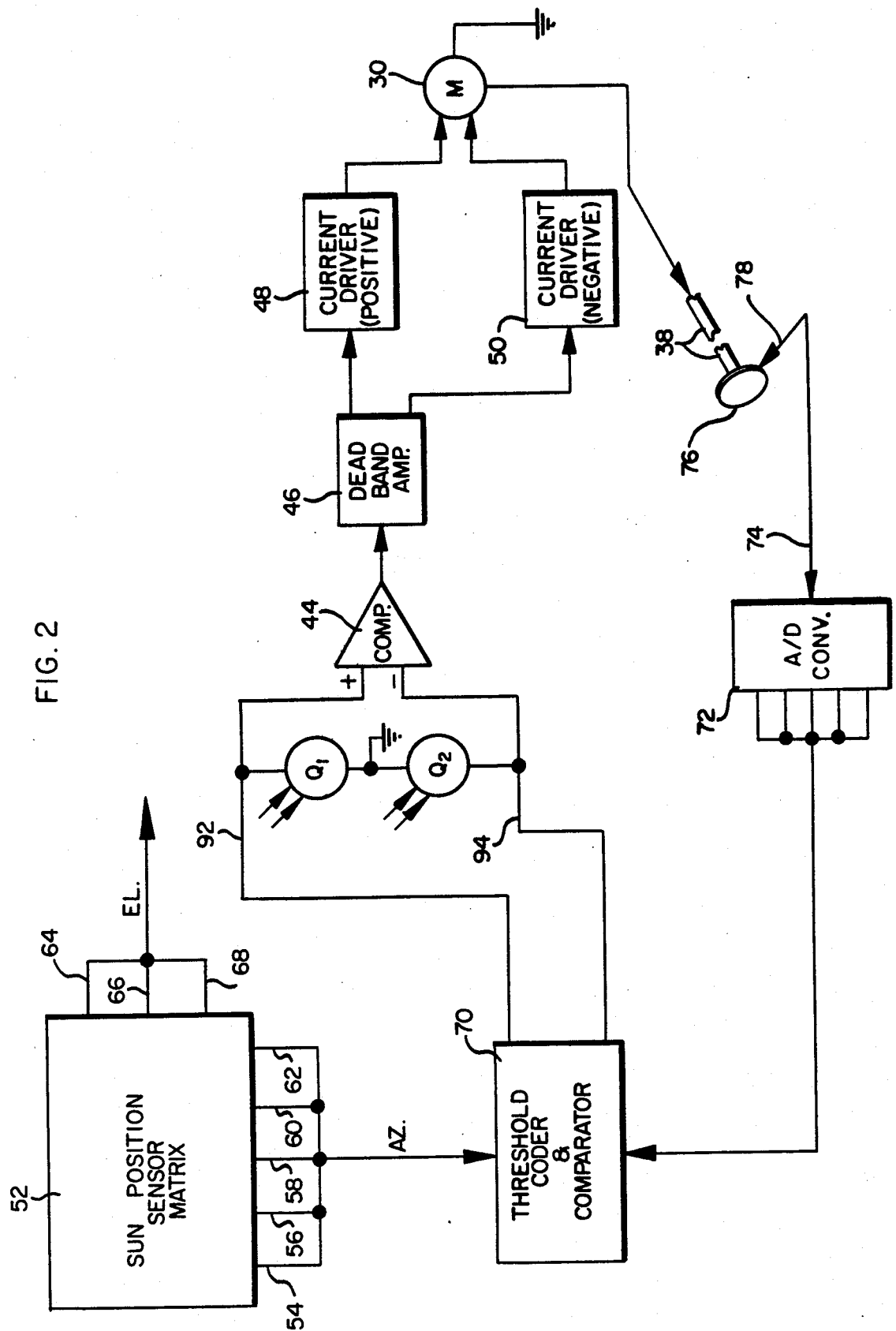
FIG. 2 is a block diagram illustrating the pair of tracking sensors and driving mechanism for positioning a solar collector/concentrator for tracking the sun, and a solar position sensor for repositioning the collector/concentrator after a period of solar obstruction.

In FIG. 2 a pair of tracking sensors $Q_1$, $Q_2$ are illustrated as connected to a comparator 44 to provide, through a dead band amplifier 46 either a signal through positive current drive 48 to drive azimuth motor 30 in one direction, or a signal through negative current drive 50 to drive the azimuth control motor 30 in the reverse direction. Tracking sensors $Q_1$ and $Q_2$ are mounted in a conventional manner on the solar concentrator 34 such that when the light incident on both of the tracking sensors is equal, there is no output from the comparator 44 and therefore no current is supplied to the azimuth motor 30. If, for instance more light is incident on sensor $Q_1$ than on $Q_2$, the value of the positive input to the comparator 44 is greater than the value of the negative input so that a signal will be supplied to current driver 48 to drive motor 30 in a position which will rotate the concentrator 34 until the light on the two tracking sensors such as $Q_1$ and $Q_2$ is provided for elevation tracking. Similarly, as in the case of the azimuth direction, an elevation comparator, dead band amplifier, positive and negative current drivers are also provided to drive elevation control motor 32 to position the concentrator 34 in the elevational direction. To simplify the illustration of FIG. 2, the elevation components have not been shown, it being understood that their structure and function are identical to the similar components described in connection with the azimuth direction.

The respective solar sensors 24 in each of the dome facets 1 through 11 are arranged electrically in a five columns by three rows matrix 52. Data relating to the solar azimuth position is presented on matrix column lines 54, 56, 58, 60, 62, and data relating to the solar elevation position is present from the solar sensors on matrix rows 64, 66, 68. The azimuth and elevation data for matrix 52 is coupled to a respective threshold coder and comparator 70. Only the coder/comparator 70 for the azimuth direction is illustrated in FIG. 2, it being understood that an identical unit is also provided for the elevation direction.

Coder/comparator 70 also receives a 4 bit digital signals from a conventional analog/digital converter 72 which converts into digital data form the analog data input on line 74 relating to the position of the concentrator azimuth shaft 38. To supply the analog data, there is provided a 10 turn follower potentiometer 76 rigidly mounted on shaft 38 and which includes an associated wiper element 78.

Thus, the concentrator azimuth shaft position as sensed by the wiper 78 is supplied in digital data form to the comparator 70. An identical potentiometer, wiper, and analog to digital controller is provided in connection with the concentrator elevation shaft 40 so that the position of shaft 40 is supplied in digital data form to a similar coder/comparator for determination of the elevation drive signal. To avoid duplication in the drawings, the elevation components are not illustrated in FIG. 2, it being understood that their structure and function can be readily understood from the description and illustration of the azimuth components.

Figure 3:
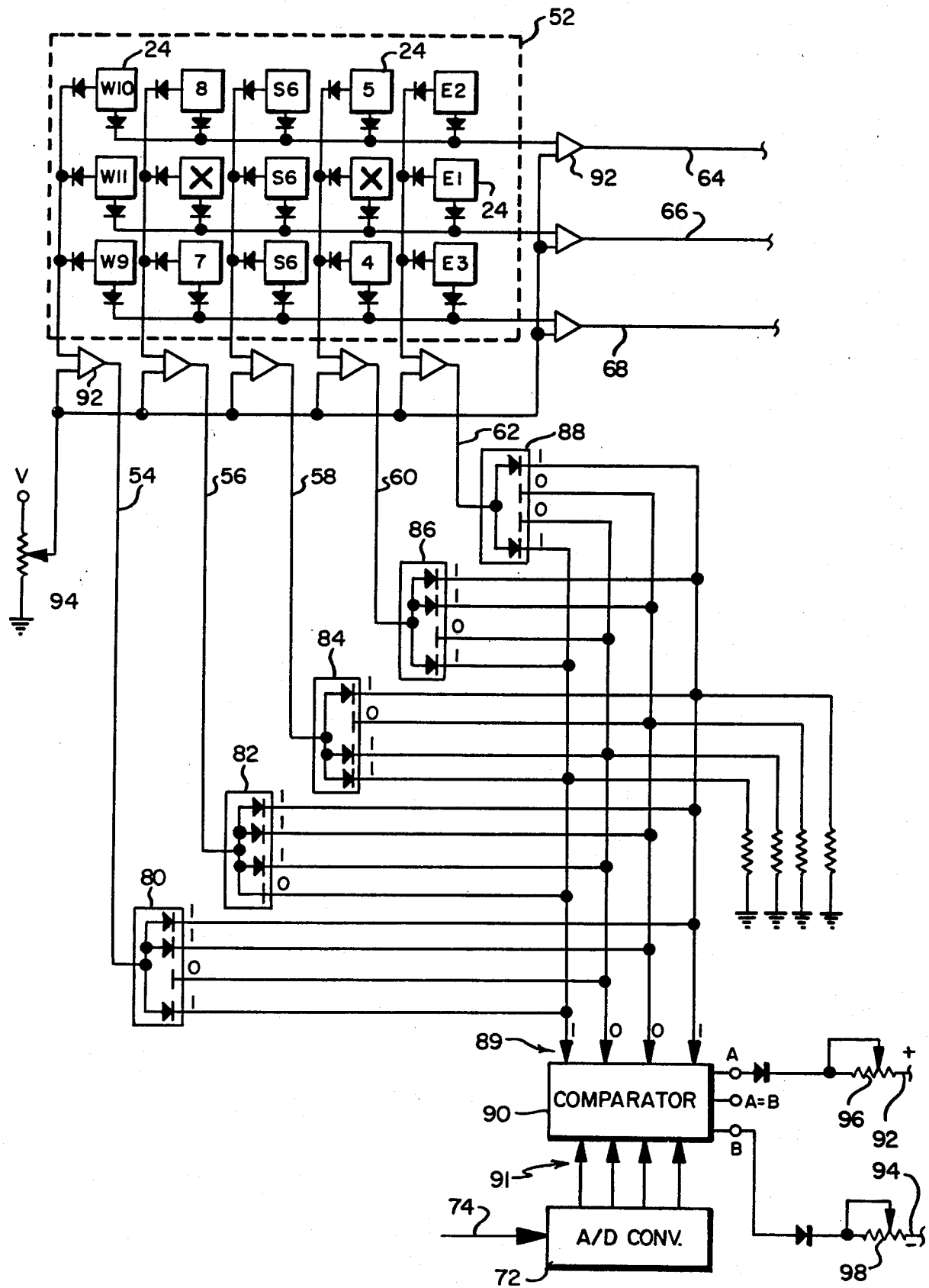
FIG. 3 is a schematic diagram illustrating the electrical connection in a matrix array of the solar sensors physically mounted on the geodesic dome of FIG. 1 and the means for coding the sensed solar position and comparing this information with position data information from the collector/concentrator.

FIG. 3 illustrates the details of the solar position sensor matrix 52 as well as the respective encoders 80, 82, 84, 86, 88, and comparator 90 of the azimuth direction. As in FIG. 2, the duplicate components for the elevation direction have not been illustrated. In the illustrated matrix array 52 in FIG. 3, each of the solar sensor 24 is shown as related to a corresponding dome facet 1 through 11 of FIG. 1. For instance, the solar sensor 24 in facet 1 is shown at the matrix position $E_1$. The two matrix positions indicated with an "X" are not connected to any solar sensor. A threshold trigger amplifier 92 is provided for each of the matrix lines so that upon setting of the threshold control 94, only a bright sun will be sufficient to trigger the respective threshold trigger amplifier 92.

The encoders 80, etc., provide a preset output code in digital data form when a signal is present at the input to the respective encoder. Thus, as an example, if the sun ray 26 is incident on facet 1, a signal will appear on line 62 to place the illustrated 1001 code at the input 89 to azimuth comparator 90. If is to be understood of course that the sun is also incident on the other dome facets, however, if it is primarily incident on facet 1, only the threshold trigger amplifier 92 in matrix line 62 will be triggered. Thus, there will be no more than one digital code present at the input 89 to comparator 90, and this code corresponds to the sensed solar position. The remaining digital codes shown in FIG. 3 are only presented for purposes of illustration. The encoders 80-88 can be conventional switching type elements of various types, such as the illustrated diodes. In FIG. 3 the lines which would be activated to provide a "1" are shown with a diode, whereas the nonactivated lines are shown without a diode.

The digital data representing the azimuth position of concentrator shaft 38 is coupled from the converter 72 to an input 91 of the comparator 90. It is to be understood that the analog/digital converter 72 is preset to provide the same four data bits, in response to the concentrator shaft position as that corresponding to the respective matrix lines 54, 56, 58, 60 or 62. Thus, if the azimuth shaft 38 is at the same range of azimuth positions corresponding to facets 1, 2 or 3, the same four bit code 1001 will be coupled to the comparator 90. Thus, the azimuth comparator 90 compares the matrix code with the concentrator shaft code and provides either a positive or a negative signal respectively on the output lines 92, 94 to supply the associated drive signals to the azimuth control motor 30. A similar situation is present for the elevation direction. Adjustable mans such as variable resistors 96, 98 are set so that when the collector 34 is facing the sun the indicated A and B signals will be substantially below the level of the signals from the tracking sensors $Q_1$ and $Q_2$. Thus, the A and B signals resulting from the sun position sensors are only effective to drive the collector 34 when the tracking sensors $Q_1$ and $Q_2$ are not directly facing the sun. The azimuth comparator 90 as well as the elevation comparator is a commercially available integrated circuit element such as a National Semiconductor Corporation MM74C85.

In operation, as the sun initially rises in the east and becomes sufficiently incident on facet 1, the threshold level set by control 95 is exceeded so that the corresponding trigger amplifier 93 is triggered to place an output signal on azimuth line 62 and elevation line 66. Encoder 88 provides the indicated four bit digital data which is coupled to the comparator 90 and compared with the four bit digital data from the analog to digital converter 72 representing the azimuth position of the solar collector 34. The comparator provides either signal A or B to drive the collector in the proper direction until the four bit digital data from converter 72 equals the data from encoder 88. At that point, the comparator ceases to put out a correction signal and the tracking sensors $Q_1$ and $Q_2$ take over to maintain the solar collector tracked onto the sun during its apparent movement from east to west. If there is no further solar obstruction during the day, the azimuth and elevation tracking sensors maintain the collector tracked onto the sun. However, if there is a period of solar obstruction, the collector 34 stops at its last position. If when the sun reappears the collector is no longer facing the sun, the tracking sensors are ineffective to reposition collector 34. At this time, if we assume the sun now reappears and is incident at a substantially normal angle onto facet 7, matrix azimuth lines 56 and matrix elevation lines 68 are activated and the collector 34 is driven until the respective comparators determine that the collector azimuth and elevation positions match the sensed solar position.

While particular embodiments of the present invention have been shown and described, it will be obvious to those skilled in the art that various changes and modifications may be made without departing from the invention in its broader aspects. Accordingly, the aim of the appended claims is to cover all such changes and modifications as may fall within the true spirit and scope of the invention.

What is claimed is:

1. A sun position sensing device comprising:

a multifaceted fixed support having exterior planar surfaces each having a predetermined angular relationship relative to the sun, a plurality of solar sensors each mounted on a different planar surface of a facet of the support and adapted to sense solar energy arriving in a respective azimuth and elevational direction;

data encoding means for a series of respective solar azimuth and solar elevational positions, each position corresponding to one of said plurality of solar sensors and the facet of the support on which it is mounted;

said data encoding means coupled to said plurality of solar sensors wherein sensing of a respective solar azimuth and elevation provides respective solar position data corresponding to the sensed solar position;

a solar collector effective for receiving solar energy in a discrete direction;

drive means for positioning said solar collector in azimuth and elevation and providing collector position data corresponding to the position of said solar collector; and comparator means receiving said collector position data from said drive means and said solar position data from said data encoding means and providing a drive signal to said drive means if said respective data is not equal.

2. In a solar collector system, including a solar collector and a two axis tracking apparatus driving the solar collector in two respective axes in response to an unobscured sun to track the sun during its apparent movement from east to west, improved means for repositioning the solar collector after a period of sun obstruction, said improvement comprising:

a fixed portion of a geodesic dome shaped support having several planar dome facets, said support positioned to face the noonday sun with one of said dome facets normal to the incident solar energy and additional facets sequentially normal to the incident solar energy during said apparent solar movement east to west during various seasons of the year;

a plurality of solar sensors each mounted on the planar surface of a respective dome facet and providing an electrical output signal representing the amount of solar incidence on a respective sensor;

means for electrically connecting said solar sensors in a matrix array of two matrix axes, said matrix axes corresponding to respective axes of said two axis tracking system, including matrix axes designating means for designating the respective matrix axes corresponding to the dome facet which is substantially normal to the sun; and driver means, including collector position designating means designating the solar collector two axis position, for driving the solar collector two axis position, and for driving the solar collector until the solar collector two axis position matches the respective matrix axes corresponding to the dome facet which is at that time substantially normal to the sun.

3. The improvement of claim 2, wherein said matrix axes designating means includes means for coding the matrix array axes corresponding to the dome facet then substantially normal to the sun.

4. The improvement of claim 3, wherein said collector position designating means includes means for coding the solar collector two axis position.

5. The improvement of claim 4, wherein said driver means includes comparator means comparing the matrix array axes code with the solar collector two axis position code and providing signals to drive the solar collector until said codes are identical.

6. The improvement of claim 4, wherein the respective coding is in digital data form.

7. The improvement of claim 6, wherein said respective matrix axes designating means and said collector position designating means initially obtain information in analog data form, and including means for converting the respective analog data into digital data form.

8. The improvement of claim 2, wherein said matrix axes designating means includes discriminator means coupled to said plurality of solar sensors for determining which of said dome facets has the highest amount of solar incidence.

9. The improvement of claim 8, wherein said discriminator means includes a threshold amplifier coupled to each sensor, and means for setting the threshold level.

10. A sun position sensor for a solar collection system comprising:

a fixed portion of a geodesic dome shaped support having several planar facets thereon adapted to sequentially face the sun at substantially normal angles of solar incidence during the apparent solar movement from east to west during various seasons of the year, said facets each corresponding to an associated solar azimuth and elevation angle;

a solar sensor mounted on the planar surface of each of said facets providing an electrical signal representing the amount of solar energy incident on the respective facet;

a first group of threshold trigger amplifiers each receiving the electrical signals from one or more solar sensors of substantially the same azimuth angle;

a second group of threshold trigger amplifiers each receiving the electrical signals from one or more solar sensors of substantially the same elevation angle;

said first and second group of threshold trigger amplifiers including means for presetting a threshold signal level which said electrical signals must exceed before the respective threshold trigger amplifier is triggered and provides an output, and wherein only one threshold trigger amplifier in each group is triggered, corresponding to the solar sensor and associated dome facet receiving the highest amount of solar energy;

digital encoder means activated by said output of said respective triggered amplifiers to provide digital data corresponding to the azimuth and elevation of the sun;

a solar collector having discrete azimuth and elevation angles at which the sun will be collected;

tracking means including azimuth and elevation drive means for moving said solar collector and tracking the sun during unobscured solar conditions as it traverses an apparent east to west movement;

means coupled to the solar collector for determining the solar collector position in terms of azimuth and elevation and providing digital data corresponding thereto; and comparator means receiving the respective digital data from said digital encoder means corresponding to the sensed azimuth and elevation of the sun, and the digital data corresponding to the solar collector position, and providing respective drive signals to the azimuth and elevation drive means to move said solar collector until the solar collector position is substantially equal to the sensed azimuth and elevation of the sun.

11. A sun position sensor according to claim 10, wherein said geodesic dome includes at least ten of said facets, each adapted to face the sun at substantially normal angles of solar incidence for about an hour.

12. A sun position sensor according to claim 10, wherein each of said geodesic dome facets is a polygon.

* * * * *